United States Patent [19]

Bauder

[11] Patent Number: 5,188,077
[45] Date of Patent: Feb. 23, 1993

[54] APPARATUS FOR A DIESEL ENGINE

[75] Inventor: Richard Bauder, Neckarsulm, Fed. Rep. of Germany

[73] Assignee: Audi A.G., Ingolstadt, Fed. Rep. of Germany

[21] Appl. No.: 784,132

[22] Filed: Oct. 29, 1991

Related U.S. Application Data

[63] Continuation of Ser. No. 210,118, Jun. 22, 1988, abandoned.

[30] Foreign Application Priority Data

Jun. 23, 1987 [DE] Fed. Rep. of Germany ....... 3720695

[51] Int. Cl.$^5$ .................... F02D 31/00; F02B 77/00
[52] U.S. Cl. .................... 123/359; 123/198 DB
[58] Field of Search ............ 123/357, 358, 359, 198 D, 123/198 DB, 449, 503

[56] References Cited

U.S. PATENT DOCUMENTS

| 3,661,130 | 5/1972 | Elteim | 123/359 |
| 3,699,935 | 10/1972 | Adler | 123/359 |
| 4,212,272 | 7/1980 | Hawk | 123/198 DB |
| 4,402,290 | 9/1983 | Hofer | 123/198 DB |
| 4,509,480 | 4/1985 | Kull | 123/359 |
| 4,515,125 | 5/1985 | Buck | 123/359 |

Primary Examiner—Carl S. Miller
Attorney, Agent, or Firm—Kane, Dalsimer, Sullivan, Kurucz, Levy, Eisele and Richard

[57] ABSTRACT

The invention relates to an apparatus for a diesel engine with a distributor injection pump with which is associated an electronically regulated fuel feed control mechanism with a rotary magnet which operates a control valve of the injection pump. In order to avoid the unintentional injection of an excessive amount of fuel caused by a error in the electronic, the fuel feed control mechanism has a rate of flow end position beyond the allowable operating range, in which a system for interrupting the fuel feed to the injection pump, e.g., an electrical fuel shutoff valve, is activated.

7 Claims, 2 Drawing Sheets

APPARATUS FOR A DIESEL ENGINE

This is a continuation of copending application Ser. No. 07/210,118 filed on Jun. 22, 1988 now abandoned.

BACKGROUND OF THE INVENTION

The invention relates to an apparatus for a diesel engine. In particular, the invention relates to a diesel engine with a distributor injection pump with which is associated an electronically regulated fuel feed control mechanism with a rotary magnet which operates a control valve of the injection pump. Circuits for electronically controlled diesel engines have become known by which the engine speed is prevented from exceeding a certain limit. In the case of a disturbance of the electronic shut-off the rotary speed could continue to increase to the point of mechanical destruction.

Consequently, an additional protective circuit is usually provided which prevents the engine from overspeeding if a defect occurs, for example, in the electronic controller. Such a circuit is the subject matter of DE-AS 19 62 573.

In diesel engines a larger amount of fuel must be injected for starting, which is greater than the full load fuel feed rate. In electronically controlled diesel engines which assist in driving a motor vehicle, an error in the electronics can abruptly shift the fuel control mechanism to the starting feed rate, resulting in a acceleration of the vehicle. The known overspeed safety devices are in this case ineffectual since they do not become active until the excess engine speed is reached.

SUMMARY OF THE INVENTION

Herewith the foregoing in mind it is a principle object of the invention to provide an apparatus which will prevent such conditions from occurring.

This problem is solved by the fact that the fuel feed rate control mechanism has, beyond the allowable operating range, an end position at which a system for the interruption of the feed of fuel to the injection pump is activated.

The apparatus according to the invention thus does not operate in relation to rotatory speed but in relation to the setting of the fuel feed rate control mechanism, so as to assure that the engine is shut off whenever the fuel feed rate control mechanism reaches a setting that is above the starting feed rate.

The interruption of the fuel feed can be accomplished by means of a switch which is operated when the fuel feed control is at the end position. If an electrical shutoff valve (ELAB) is present for the interruption of the supply of fuel to the injection pump, this switch can activate this shutoff valve. If the fuel feed control contains a rotating magnet electronically controlled according to operating parameters, the switch can be used to reverse the polarity of the rotating magnet so that the fuel feed control is turned back to zero fuel feed. This reversal is performed extremely fast, since a high voltage is present in the winding of the rotary magnet when the fuel feed control is in the end setting. Alternatively, a mechanical system which can be triggered in the end position of the fuel feed control to its zero position.

BRIEF DESCRIPTION OF THE DRAWINGS

For a fuller understanding of the nature and the objects of the invention, reference should be had to the following detailed description, taken in connection with the accompanying drawings, in which.

DETAILED DESCRIPTION OF THE PREFERRED EMBODIMENT

Figure 1:
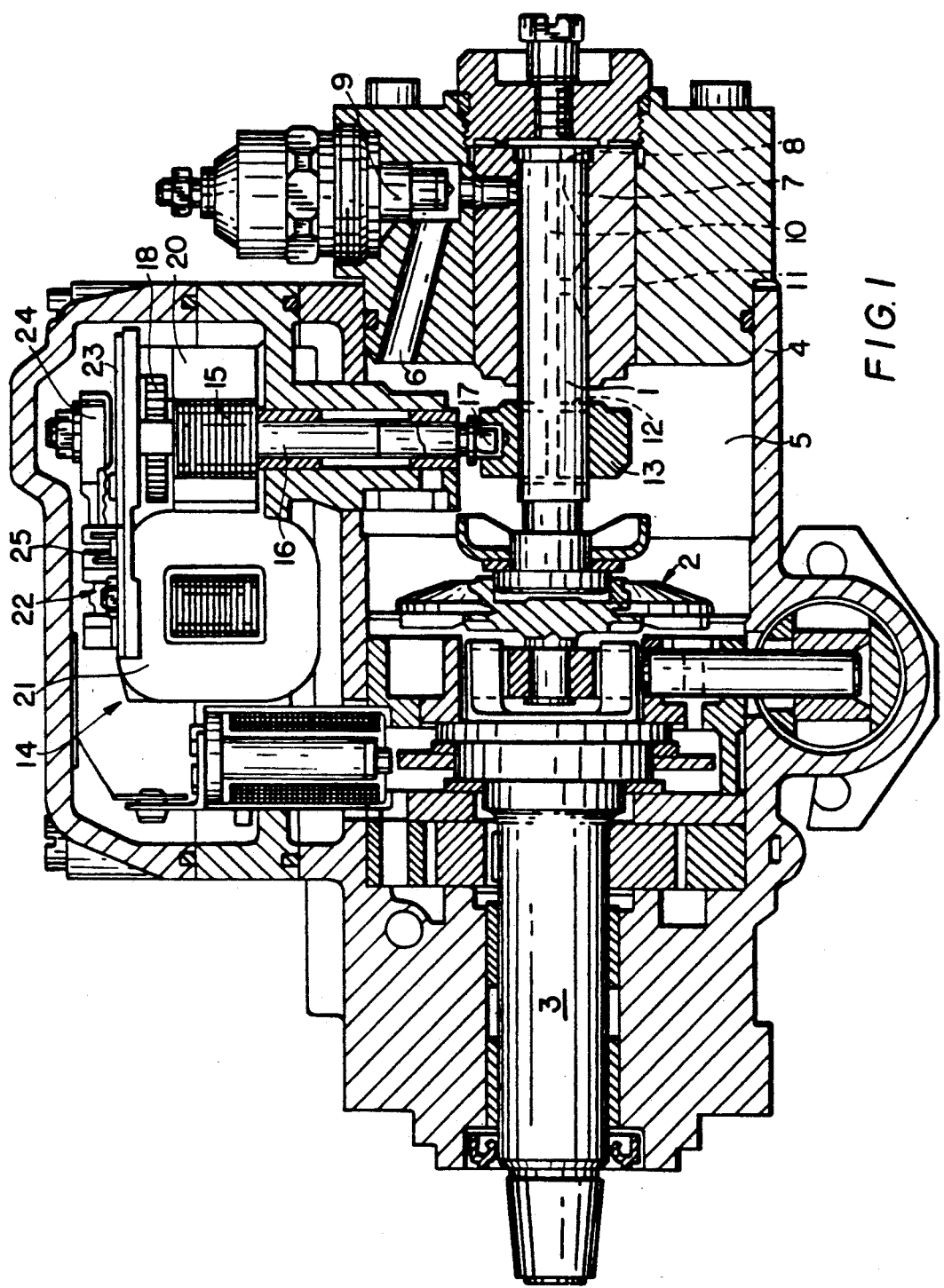
FIG. 1 is a longitudinal sectional view through a distributor injection pump.
Figure 2:
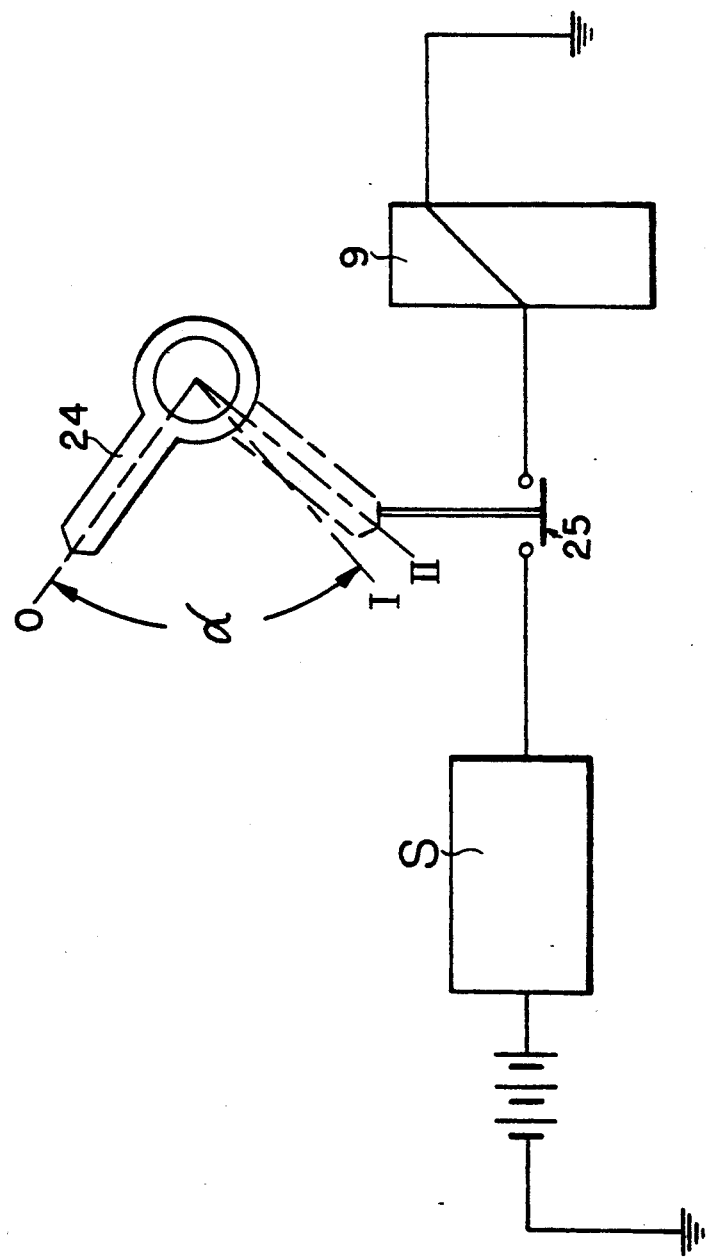
FIG. 2 is a circuit diagram of the electrical shutoff valve.

Referring now to FIGS. 1-2 of the drawings, the distributor injection pump has a pump piston 1 which is set in a reciprocating and simultaneous rotating movement by a cam 2 driven by a shaft 3. The casing 4 of the pump contains a pressure chamber 5 which communicates through a pressure line 6 and longitudinal grooves 7 disposed in the circumferential surface of the piston 1 with a pump chamber 8. In the pressure line 6 there is disposed an electrical fuel shutoff valve 9 (ELAB) which in the unenergized state is closed and thus shuts off the pressure line 6 in the event of a power failure.

During the pumping stroke of piston 1 the fuel passes through a longitudinal bore 10 to a distributor groove 11 which upon each pumping stroke communicates with an injection line, not shown. The longitudinal bore 10 communicates with a transverse bore 12 which, after a certain amount of piston movement, is released by a ring valve 13 and connects the pump chamber 8 with the pressure chamber 5, thus ending the injection process.

The ring valve 13 is displaceable by a rotary magnet 14 in order to vary the amount injected. The rotary magnet 14 has a core 20 with a coil 21 and an armature 15 which is mounted on a shaft 16 which is coupled to the ring valve 13 by an eccentric driver arm 17, so that a rotation of the armature 15 will result in a movement of the ring valve 13. The shaft 16 is engaged by a spiral return spring 18. The rotary magnet 14 is controlled by an electronic controller S (FIG. 2) which also supplies the shutoff valve 9 with current.

To detect the angle of the fuel feed control consisting of the rotary magnet 14, the shaft 16 and the ring valve 13, the arm 24 of a potentiometer 22 is mounted on the end of the shaft 16, and the base plate 23 of the potentiometer bears a limit switch 25 which at the end position of the rotary magnet 14 is operated by the potentiometer arm 24 and interrupts the supply of power to the shutoff valve 9.

In FIG. 2 the circuit of the shutoff valve 9 is represented diagrammatically. The potentiometer arm 24 is represented in solid lines in the null position=rate of feed 0. The allowable range of operation is indicated by the angle. The end point of this range is marked I. Within the range the amount of fuel to be injected is regulated in the usual manner according to the operating parameters, a larger amount being injected for starting the engine, at which the potentiometer arm 24 is in position I. In ordinary distributor injection pumps the range of movement of the fuel feed control terminates at this position I. If in normal operation an error in the electronics or a breakage of the return spring 18 causes the fuel feed control to turn abruptly to position I, this can result in an acceleration of the motor vehicle if the engine is used for such operation. To prevent this, a full-flow end position II is provided beyond the allowable operating range of the fuel feed control, at which the potentiometer arm 24 operates the limit switch 25 which shuts off the current from the electrical shutoff valve 9 and thus stops the feeding of fuel causing the internal combustion engine to stop immediately. This state is represented in FIG. 2.

As a variant of the embodiment represented, the limit switch 25 can be a reversing switch which at the end of travel of the potentiometer arm 24 reverses the polarity of the winding of coil 21, so that the armature 15 is turned very rapidly to its initial position corresponding to zero pumping of the injection pump. Lastly, the limit switch 25 could also be disposed in the line to the coil 21 in order to interrupt this line whenever the potentiometer arm 24 reaches its full-flow end position II. The return spring 18 then brings the shaft 16 back to its starting position. In any case the limit switch 25 is in the form of a tripping switch which remains in its open position after actuation by the potentiometer arm 24 even if no additional force is acting on it.

I do not limit myself to any particular details of construction set forth in this specification and illustrated in the accompanying drawings, as the same refers to and sets forth only certain embodiments of the invention, and it is observed that the same may be modified without departing from the spirit and scope of the invention.

Having thus described the invention, what I claim as new an desire to be served by Letters Patent is as follows:

1. An electronically controlled fuel injection pump for a diesel engine, having a high-pressure fuel chamber and a low-pressure fuel chamber and a passage connecting said chambers, a piston reciprocable within said high-pressure fuel chamber and comprising and internal bore having first and second ends opening respectively into the high-pressure and low-pressure fuel chambers, a sleeve sliding on said piston for controlling said second end, a rotary magnet for displacing said sleeve in dependence on signals received from a electronic control unit determining the rate of fuel delivered from said high-pressure fuel chamber to a fuel injection line in dependence on engine parameters, a mechanical arm associated with said rotary magnet for recognizing the angle of rotation of said rotary magnet and, therewith, the amount of displacement of said sleeve and the amount of fuel injected, and electrically actuable safety valve movable between open and closed positions in which it respectively permits and prevents flow of fuel through said passage, said valve being arranged to assume its open position upon energization and its closed position upon deenergization, and a switch disposed in an electric line leading to said valve said switch being directly actuable by said arm if the angle of rotation of said rotary magnet exceeds a predetermined value to deenergize said valve.

2. An electronically controlled fuel injection pump for a diesel engine, having a high-pressure fuel chamber and a low-pressure fuel chamber and a passage connecting said chambers, a piston reciprocal within said high-pressure fuel chamber and comprising an internal bore having first and second ends opening respectively into the high-pressure and the low-pressure fuel chamber, a sleeve sliding on said piston for controlling said second end, a rotary magnet for displacing said sleeve in dependence on signals received from an electronic control unit determining the rate of fuel delivered from said high-pressure fuel chamber to a fuel injection line in dependence on engine parameters, a mechanical arm associated with said rotary magnet for recognizing the angle of rotation of said rotary magnet and, therewith, the amount of displacement of said sleeve and the amount of fuel injected, and a switch for reversing the polarity of said rotary magnet, said switch being directly actuable by said arm if the angle of rotation of said rotary magnet exceeds a predetermined value.

3. An electronically controlled fuel injection pump for a diesel engine, having a high pressure fuel chamber and a low pressure fuel chamber and a passage connecting said chambers, a piston reciprocable within said high pressure fuel chamber and comprising an internal bore having first and second ends opening respectively into the high pressure and the low pressure fuel chambers, a sleeve sliding on said piston for controlling said second end, a rotary magnet comprising a coil for displacing said sleeve against spring force in dependence on signals received from an electronic control unit determining the rate of fuel delivered from said high pressure fuel chamber to a fuel injection line in dependence on engine parameters, a mechanical arm associated with said rotary magnet for recognizing the angle of rotation of said rotary magnet and, therewith the amount of displacement of said sleeve and the amount of fuel injected, and a switch for interrupting an electric line leading to said coil, said switch being directly actuable by said arm if the angle of rotation of said rotary magnet exceeds as predetermined value.

4. An apparatus according to claim 1 further comprising a switch which can be actuated in the end position of the fuel feed control mechanism and which reverses the polarity of the rotary magnet.

5. An apparatus according to claim 1, further comprising a mechanical system for returning the fuel feed control mechanism to its null position, said mechanical system being actuated in the end position of the fuel feed control mechanism.

6. An apparatus according to claim 1 further comprising a switch which can be actuated in the end position of the fuel feed control mechanism and which reverses the polarity of the rotary magnet.

7. An apparatus according to claim 1 further comprising a mechanical system for returning the fuel feed control mechanism to its null position, said mechanical system being actuated in the end position of the fuel feed control mechanism.

* * * * *